Aug. 15, 1939     O. U. ZERK ET AL     2,169,332
HOLD-OVER ARRANGEMENT FOR REFRIGERANT SYSTEM EVAPORATORS
Filed July 1, 1935     4 Sheets-Sheet 1
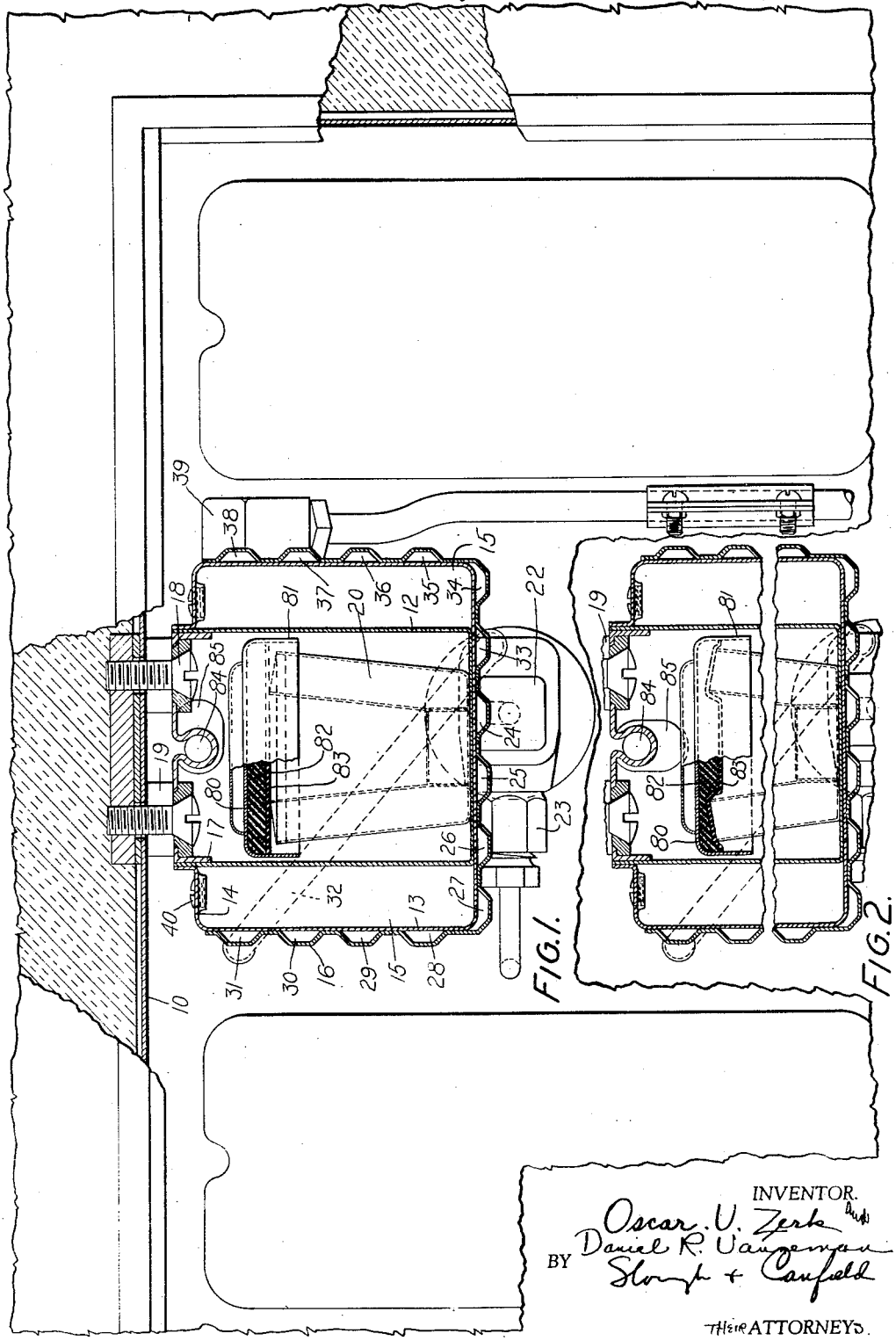

Aug. 15, 1939  O. U. ZERK ET AL  2,169,332
HOLD-OVER ARRANGEMENT FOR REFRIGERANT SYSTEM EVAPORATORS
Filed July 1, 1935  4 Sheets-Sheet 2

INVENTOR.
Oscar U. Zerk and
BY Daniel R. Van ___
Slough & Canfield
THEIR ATTORNEYS.

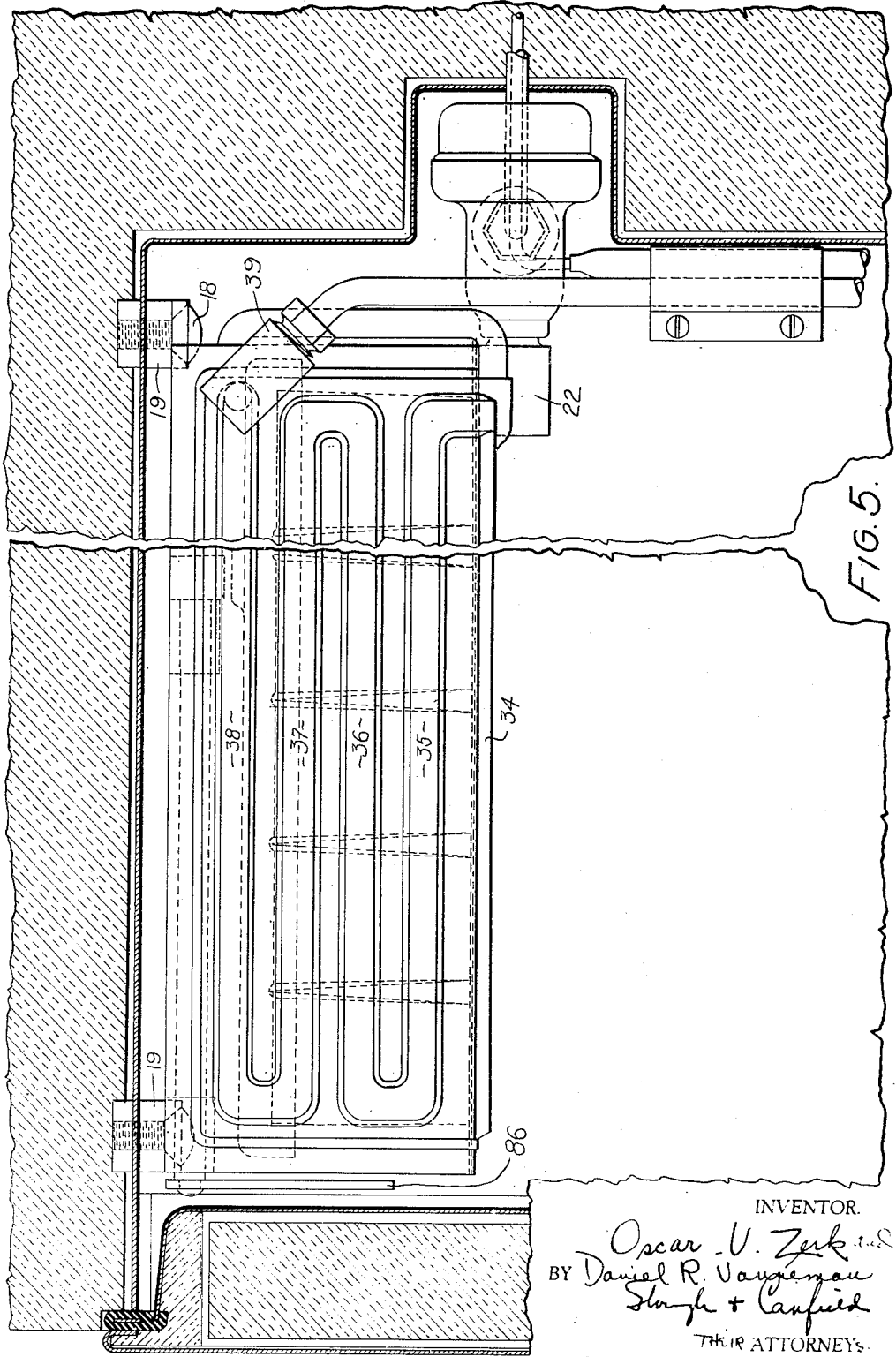

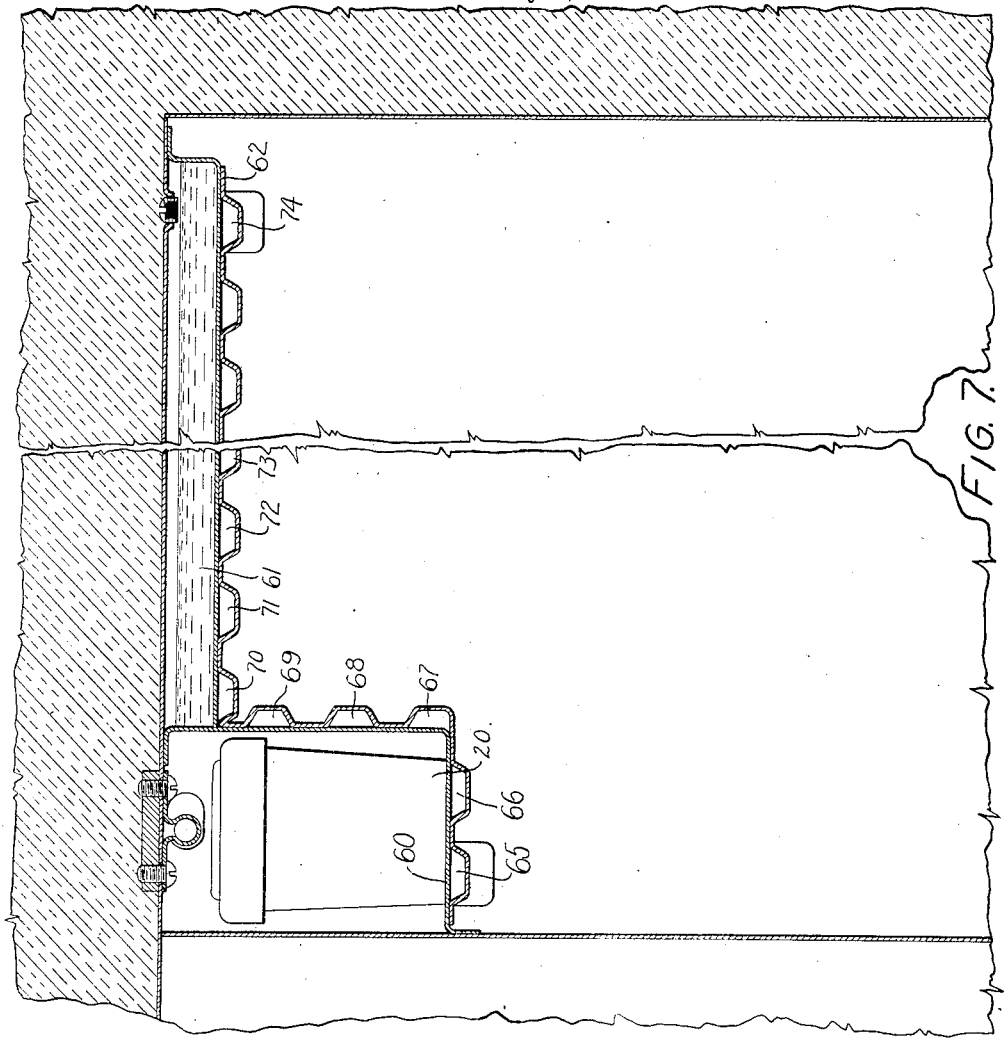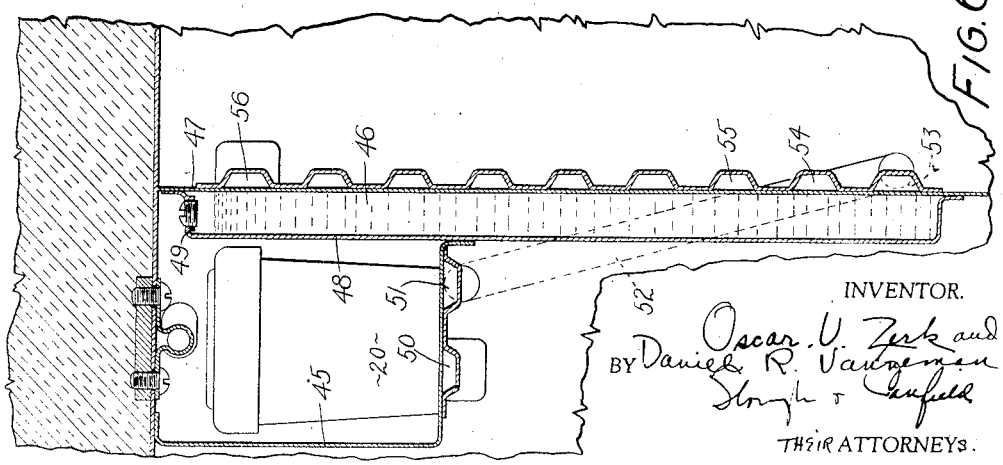

Patented Aug. 15, 1939

2,169,332

UNITED STATES PATENT OFFICE 2,169,332

HOLD-OVER ARRANGEMENT FOR REFRIGERANT SYSTEM EVAPORATORS

Oscar U. Zerk and Daniel Roland Vanneman, Chicago, Ill.; said Vanneman assignor to said Zerk Application July 1, 1935, Serial No. 29,332

5 Claims. (Cl. 62—95)

This invention relates to refrigeration systems, and more particularly to refrigeration systems and apparatus adapted for use in connection with automotive vehicles.

The application of refrigeration to moving vehicles such as automotive passenger vehicles, presents problems which differ from those encountered in stationary refrigeration systems due to the intermittent operation of the vehicle and the variations in vehicle speed. In small refrigeration systems of the compressor, condenser and evaporator type, refrigeration will take place shortly after the vehicle engine has initially started and the refrigerating effect should be sufficient to prevent spoilage of food contained in the cooling compartment. The evaporator for such a system may consist of a small coil placed in the cooling compartment, but such systems would effect refrigeration only during the period when the engine and correspondingly the compressor were in operation. In other words, refrigeration will be available only when the automotive vehicle is moving or the engine is running at a speed equivalent to a vehicle speed in excess of twenty-five miles per hour.

If the system were non-operative for an hour or two, particularly on warm summer days, food placed in the cooling compartment would warm up very rapidly and spoilage would quickly occur. To obviate such a condition and provide refrigeration when the system is non-operative, requires the presence during the idle period of some heat absorbing means, such means being usually termed "hold-over" material. These materials have the capacity of giving up heat during periods when the refrigeration unit is in operation and absorbing heat during non-operative periods of the system.

We are familiar with various types of hold-over material such as the solid type which has a low specific heat and can therefore give up or absorb only small amounts of heat without rapid fluctuations of temperature. Hold-over materials that remain in a liquid state have higher specific heat, but also pass through a wide temperature range while giving up or absorbing relatively small quantities of heat.

We preferably employ mixtures of liquids and salts, which have true eutectic freezing points and which can be quickly brought to their eutectic freezing point providing such freezing point is above that of the refrigerant temperature.

In a system continuously refrigerated, such hold-over materials are changed from a liquid into a solid state without change in temperature with the removal of heat. Thus, when the refrigeration system is non-operative due to the non-operation of the vehicle engine, these frozen hold-over mixtures begin to absorb heat at a constant temperature until such time that all of the solid material has reverted to liquid form. Thus, several hours after refrigeration has stopped, the compartment will remain cool.

Although the hold-over material when frozen will be at a somewhat higher temperature than that of the refrigerant, it will be possible to maintain almost as low a temperature within the cooling compartment when the compressor is non-operative as when the compressor is in operation. The temperature variations will be only a few degrees and will be insufficient to cause spoilage of food contained in the cooling compartment.

It is an object of our invention, therefore, to provide, in a refrigerant system having an intermittently operable refrigerating unit and an evaporator, means for maintaining the evaporator temperature substantially constant over relatively long non-operable periods of the refrigerating unit.

Another object of our invention is to provide, in a refrigerant system of the compressor, condenser and evaporator type, hold-over material for maintaining the evaporator temperature substantially constant during non-operating periods of the compressor and which hold-over material is so associated with the evaporator as to have a maximum efficiency in absorbing and giving up heat with a minimum temperature fluctuation.

Another object of our invention is to provide a refrigerating system of the compressor, condenser and evaporator type including a refrigerator chamber for the evaporator, wherein hold-over material is associated with the evaporator and means are provided for substantially concurrently effecting freezing of the hold-over material and cooling the refrigerator chamber.

Another object of our invention is to provide a refrigerating system of the above type including a refrigerator cabinet, an evaporator disposed in the cabinet and adapted to have ice cubes formed therein, hold-over material associated with the evaporator to maintain the evaporator and chamber at low temperatures during non-operating periods of the system, and wherein means are provided for substantially concurrently freezing the ice cubes, cooling the hold-over material, and cooling the refrigeration chamber.

Another object of our invention is to provide a refrigeration system of the above type including an evaporator cooled by refrigerant coils and having hold-over materials associated therewith, and wherein the refrigerant coils and hold-over materials are so located relative to the evaporator that there will be sufficient surface of the evaporator in contact with air circulating in the cooling compartment within which the evaporator is disposed to continue the refrigeration.

Another object of our invention is to provide a refrigerant cabinet including an evaporator having an improved hold-over arrangement whereby a refrigerating temperature is maintained by a eutectic mixture associated with the evaporator and supplementing the cooling effect of ice cubes or the like.

Other objects of my invention and the invention itself will become increasingly apparent from a consideration of the following description and drawings, wherein:

Fig. 1 is a front elevational view, partially in section, of a preferred embodiment of my invention showing a hold-over evaporator, a refrigeration passageway, ice cube tray, and hold-over compartment;

Fig. 2 is a fragmentary elevational view generally similar to Fig. 1 illustrating a cover means for the tray in compressed position;

Fig. 5 is a side elevational view of the evaporator and associated parts illustrated in Fig. 1;

Fig. 6 is a vertical longitudinal sectional view showing a modification of my invention; and, Fig. 7 is a sectional view generally similar to Fig. 6 showing a further modification of my invention.

Figure 3:
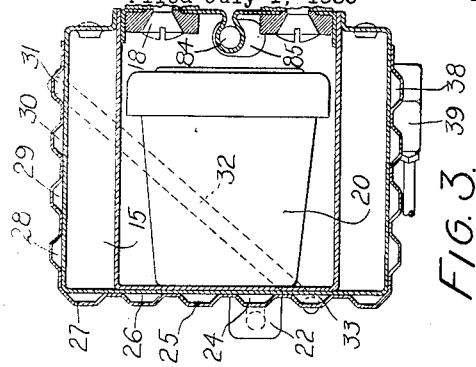
Fig. 3 is a vertical sectional view illustrating the evaporator, refrigerant passageway and hold-over compartments of the embodiment of Fig. 1.

Referring now to the drawings, we have indicated generally at 10 a suitably insulated refrigerator cabinet having an open type U-shaped evaporator, generally indicated at 11, suspended from the top of the compartment.

The evaporator 11 preferably comprises a U-shaped inner stamping 12 of sheet metal, an intermediate generally U-shaped stamping 13 having its lateral walls spaced outwardly from the walls of inner stamping 12 and the top portion 14 and the end portion (not shown) bent inwardly to sealingly engage the inner stamping and form pockets therewith as indicated at 15—15. An outer stamping 16 is formed with a continuous groove therein whereby upon the stamping 16 being shaped in U-form and sealingly engaged with the outer wall and base of intermediate stamping 13 along each side of the continuous groove, a continuous passageway will be formed adapted to have refrigerant passed therethrough in a manner to be later described.

The aforesaid stampings 12, 13 and 16 are preferably formed of sheet steel faced with copper whereby all contacting surfaces may be weldingly secured by clamping the stampings together and placing the stampings in a non-oxidizing furnace, such as a nitrogen furnace.

Cross straps 17 are secured in any suitable manner as by welding and serve to hold the evaporator and form the means for suspending the evaporator from the cooling compartment. The cross straps 17 are perforated and screws 18 encased by suitable insulating material 19 are projected through the perforations and threadedly engage the compartment top.

The ice cube tray and its associated parts are as generally indicated at 20 and are removably supported by the evaporator; but the details of tray 20 form no essential part of the present invention.

In our copending application Serial No. 29,333, filed July 1, 1935, we have illustrated a refrigerating system adapted to automotive vehicles of the compressor, evaporator and condenser type wherein a thermally responsive expansion valve controls the passage of condensed liquid refrigerant from the condenser to the evaporator and wherein a second valve also thermally responsive controls the passage of the refrigerant fluid from the evaporator to the suction side of the compressor.

In operation, the expansion valve, indicated at 22, Fig. 1, is sealingly secured to a fitting 23 sealed to the inlet portion of the grooved passageway 16. The refrigerant passes from the expansion valve 22, through fitting 23 and through the interconnected passageways indicated at 24, 25, 26, 27, 28, 29, 30, and 31 successively; from passageway 31, the refrigerant passes through a tube 32 disposed at the rear of the evaporator downwardly to passageway 33 and thence successively through passageways 34, 35, 36, 37 and 38 to an outlet fitting 39 at the outlet end of the passageway. The outlet connection 39 sealingly joins a conduit effecting passage of the refrigerant directly to the suction side of the compressor or through the evaporator control valve previously mentioned.

The passage of the refrigerant through the evaporator in this manner acts to flood the coils with liquid refrigerant, giving the best arrangement for refrigeration. A most important feature of the design is the arrangement of the coils to first supply refrigerant freezing the ice cubes disposed in tray 20 as will be clearly understood by reference to Fig. 1 wherein it is noted that passageways 24, 25 and 26 through which the refrigerant first passes substantially underlie the base of tray 20. Heat is absorbed by the refrigerant when traversing the passageway from both the inner and external surfaces of the evaporator portion forming the passageway, as previously explained the heat absorption from the inner surfaces freezing the ice cubes in tray 20 and at the same time the heat absorption at the opposite or outer side is cooling the air adjacent thereto in the compartments. Additionally, the hold-over mixture which will be in liquid form in pockets 15 will be first subjected to a freezing temperature at the base portion of the pockets permitting expansion of the liquid at the liquid level.

Various types of hold-over materials may be employed as previously explained, but we preferably employ mixtures having eutectic freezing temperatures of approximately 10 to 15 degrees Fahrenheit. These mixtures are preferably non-acid and non-alkaline and to prevent electrolysis may contain a small percentage of chromates. We preferably employ eutectic mixtures of salt and water such as sodium chloride and water, ammonium nitrate and water, and ammonium chloride and water.

The compartments or pockets 15 of the evaporator may be supplied with the hold-over mixture through openings indicated at 40, Fig. 1, and closed with sealing plugs, a sufficient air space being provided above the liquid level for expansion.

We contemplate that other arrangements of the passageways may be effected to accomplish similar results and that our invention is not to be limited to this particular arrangement other than freezing of the hold-over mixture from the bottom of the evaporator or compartment upwardly.

We have illustrated in Fig. 6 a modification of our invention wherein the tray 20 is supported by a generally L-shaped sheet steel member, preferably copper-faced as previously described, the upstanding portion being secured to the top of the cooling compartment and the horizontally extending portion being secured to a vertically extending hold-over compartment generally indicated at 46. The hold-over compartment 46 comprises a vertically extending plate 47 suitably affixed to the refrigerator cabinet and a relatively shallow cup member 48 sealingly secured to plate 47 at peripheral portions, the compartment 46 being filled with hold-over material through an opening 49 suitably sealed by detachable plugs.

The lower face of L-shaped element 45 has a grooved plate sealingly secured thereto to form interconnected passages indicated at 50 and 51, passage 51 being connected by a tube 52 to the lowermost passageway 53 of a plurality of passageways formed on the outer side of plate 47 by sealingly securing a grooved plate thereto to form interconnecting passageways or a continuous passage.

It will now be understood that in this modification refrigerant enters passageway 50 from the expansion valve and thence passes through passageway 51 effecting freezing of the ice disposed in tray 20, thence passing downwardly through tube 52 to passageway 53 and thence successively upwardly through passages indicated at 54, 55 to the topmost passageway 56. The refrigerant may pass from the passageway 56 through an outlet connection and conduit leading to the suction side of the compressor as previously described.

In this modification it will be noted that the ice cubes or the like in tray 20 are first frozen and that the hold-over material is frozen from the base of the hold-over compartment and upwardly and that at the same time the air surrounding the evaporator is cooled sufficiently due to the considerable area of cooling surface presented.

Referring now to Fig. 7, we have shown a further modification of our invention somewhat similar to that described in connection with Fig. 6 but wherein a greater length of passageway is provided adjacent tray 20 and the hold-over compartment is disposed adjacent the top of the refrigerator cabinet. In this modification, the tray 20 is supported by an L-shaped member 60 suitably secured to the top and lateral wall portions of the refrigerator cabinet; and the hold-over compartment, generally indicated at 61, is formed by securing a peripherally flanged plate 62 sealingly to the top of the refrigerator cabinet and to the upstanding portion 60. A continuous refrigerant passageway is provided by a grooved plate secured to the lower face and outer lateral wall of element 60 and to the base of the hold-over compartment in the manner previously described.

Refrigerant will enter the passageway 65 and successively pass through passageways 66, 67, 68, 69, 70, 71, 72, 73 and so on to passageway 74 and thence, as previously described to the compressor. In this modification it will be noted that the ice cubes or the like contained in tray 20 will be first frozen and that the hold-over mixture again is frozen from the base upwardly while presenting a considerable area for concurrently cooling air within the refrigerator cabinet adjacent the evaporator.

We contemplate that in all the modifications described the passageways may be replaced by a continuous coil generally similarly disposed.

Figure 4:
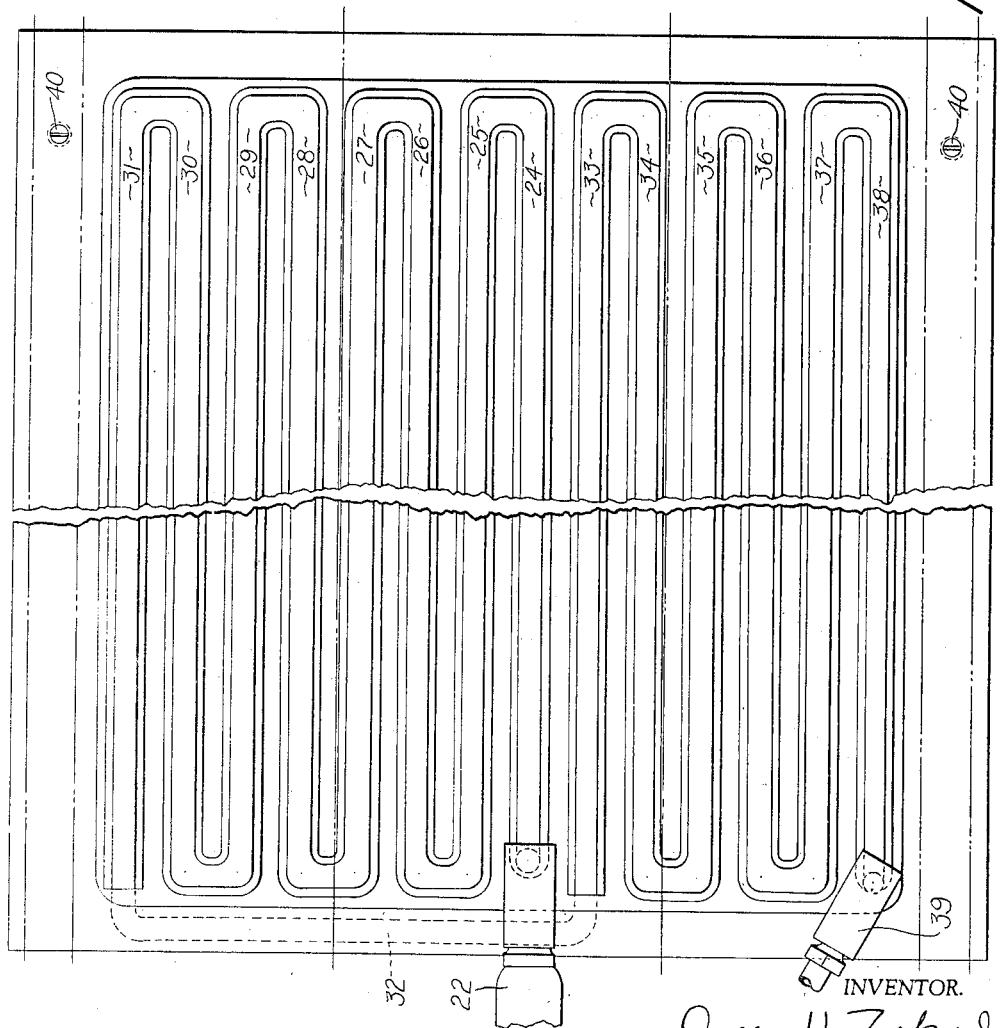
Fig. 4 is a diagrammatic view showing a development of the refrigerant passageway illustrated in Fig. 2 substantially in a common plane.

Referring now particularly to Figs. 1-4 inclusive, it will be noted that the ice cube tray or container shown is of elongated form and to insure that articles disposed therein will be maintained therein without being subjected to undue shock, we provide a metal cover 80 provided with a depending peripheral flange 81 maintained spaced from the container walls. The cover top contains relatively thick sponge rubber 82 maintained by a relatively thin base layer of harder sheet rubber 83.

A shaft 84 is rotatably mounted above cover 80 and is provided with eccentric cover engaging portions 85 whereby when the shaft is rotated by a handle 86, the cover will be resiliently locked in position on the tray 20 indicated in Fig. 2.

Since the refrigerant system containing my invention is placed in a moving vehicle, both the hold-over solution or solution of brine and the material in the container or tray will be in a state of agitation during the time that the car is traveling over a road, especially when the car is traveling over an uneven road. Due to such agitation the hold-over solution or solution of brine and the material in the container as well, will freeze very rapidly and the freezing will take place much faster than when said solutions and material in the container are maintained in a substantially stationary state.

Although we have shown and described modifications of our invention, we contemplate that numerous and extensive departures may be made therefrom without departing from the spirit of our invention and the scope of the appended claims.

Having thus described our invention what we claim is:

1. In a refrigerating system, the combination with an evaporator shell, a container for material to be refrigerated, a compartment containing holdover material, of a continuous conduit therefor formed on the external wall of the evaporator shell and compartment so arranged that refrigerant passing through the passageway will first subject the base of the container to a sub-freezing temperature and subsequently subject the hold-over mixture to a freezing temperature with the lowermost portions of the hold-over mixture being subjected to refrigerant having greater heat exchange capacity than successively upwardly disposed portions of the mixture, and the passageway presenting a considerable surface area contacting air surrounding the evaporator shell for cooling the same.

2. In a refrigerating system, the combination with a refrigerator cabinet, an evaporator shell disposed in the cabinet, a tray adapted to contain ice removably disposed in the evaporator shell, a compartment containing a hold-over mixture having a eutectic freezing temperature substantially 15 degrees Fahrenheit, of a conduit formed by sealingly securing an element provided with a continuous groove to the external walls of the evaporator shell and hold-over compartment and thereby forming a continuous passageway for refrigerant therebetween so arranged that refrigerant traversing the passageway will substantially concurrently subject the tray to a sub-freezing temperature, freeze the hold-over mixture at the base of the compartment therefor and successively upwardly, and cool air surrounding the evaporator shell.

3. In a refrigerating system, a refrigerating cabinet, a generally U-shaped evaporator shell supported by the cabinet, a tray adapted to contain ice supported by the evaporator shell, a closed compartment formed in the evaporator shell adjacent the tray and containing a hold-over mixture having a eutectic freezing temperature of substantially 15 degrees Fahrenheit, of a conduit secured to the external walls of the compartment and the evaporator shell and following a tortuous path therealong so arranged that liquid refrigerant entering said conduit will first subject the tray to a sub-freezing temperature and subsequently freeze the hold-over mixture from the lowermost portion upwardly permitting expansion of the liquid portions of the mixture.

4. In a refrigerating system adapted to use in an automotive vehicle and inoperable for relatively long periods during non-operation of the vehicle, the combination of an evaporator shell, a container for material to be refrigerated supported thereby, a compartment containing hold-over mixture, a continuous conduit formed on the outer walls of the evaporator shell and compartment so arranged that refrigerant passing through the conduit will first cool the container base and subsequently subject hold-over mixture to freezing temperature with the lowermost portion of the hold-over mixture being subjected to refrigerant having a greater heat exchange capacity than successively upwardly disposed portions of the mixture, and the mixture being adapted to absorb heat from the container and air surrounding the compartment during non-operating periods of the vehicle.

5. In a refrigerating system adapted to use in an automotive vehicle and inoperable for relatively long periods during non-operation of the vehicle, the combination with a cabinet of an evaporator shell, a container for material to be refrigerated supported thereby, a compartment containing hold-over mixture, a continuous conduit formed on the external walls of the evaporator shell and compartment so arranged that refrigerant traversing the conduit will first cool the base of the container and subsequently subject the mixture to a freezing temperature with the lowermost portion of the hold-over mixture being subjected to refrigerant having a greater heat exchange capacity than successively upwardly disposed portions of the mixture, and the major portion of the conduit length being associated with the compartment to effect freezing of the hold-over mixture without a corresponding reduction of temperature of the air within the cabinet whereby liquifying of the hold-over mixture during non-operating periods of the vehicle will provide considerable heat exchange without substantial change in the hold-over mixture temperature.

OSCAR U. ZERK.
DANIEL ROLAND VANNEMAN.